Feb. 7, 1933.  H. A. WHEELER  1,896,500
METHOD OF AND MEANS FOR ELIMINATING CAPACITIVE COUPLING
Filed Sept. 22, 1924   4 Sheets-Sheet 1

INVENTOR
Harold A. Wheeler
BY
Pennie, Davis, Marvin and Edmonds
ATTORNEYS

Feb. 7, 1933.  H. A. WHEELER  1,896,500
METHOD OF AND MEANS FOR ELIMINATING CAPACITIVE COUPLING
Filed Sept. 22, 1924  4 Sheets-Sheet 2

INVENTOR
Harold A. Wheeler
BY
Pennie, Davis, Marvin and Edmonds.
ATTORNEYS

Feb. 7, 1933.   H. A. WHEELER   1,896,500
METHOD OF AND MEANS FOR ELIMINATING CAPACITIVE COUPLING
Filed Sept. 22, 1924   4 Sheets-Sheet 3

INVENTOR
Harold A. Wheeler.
BY
Pennie, Davis, Marvin and Edmonds.
ATTORNEYS

Feb. 7, 1933. H. A. WHEELER 1,896,500
METHOD OF AND MEANS FOR ELIMINATING CAPACITIVE COUPLING
Filed Sept. 22, 1924 4 Sheets-Sheet 4

INVENTOR
Harold A. Wheeler
BY
Pennie, Davis, Marvin and Edmonds.
ATTORNEYS

Patented Feb. 7, 1933

1,896,500

UNITED STATES PATENT OFFICE

HAROLD A. WHEELER, OF WASHINGTON, DISTRICT OF COLUMBIA, ASSIGNOR TO HAZELTINE CORPORATION, OF JERSEY CITY, NEW JERSEY, A CORPORATION OF DELAWARE

METHOD OF AND MEANS FOR ELIMINATING CAPACITIVE COUPLING

Application filed September 22, 1924. Serial No. 739,080.

This invention is directed to the neutralization of capacitive coupling between electric circuits, especially where such coupling is unavoidable and causes undesirable reactions between the circuits.

The invention is particularly applicable to audion circuits. The term "audion" as used herein is defined as any thermionic electric device, or valve, comprising a cathode, herein referred to as the "filament"; an anode, referred to as the "plate"; and an electrostatic control electrode, referred to as the "grid". The arrangement of the electrodes is such that variations in the potential of the grid relative to the filament affect the current between plate and filament in a manner equivalent to proportional changes in the potential of the plate relative to the filament. Because of the finite dimensions of the audion, the capacity between any two of the electrodes is sufficient to be appreciable and is, in addition, usually increased by capacity between the external connections to said two electrodes. In a common case where one resonant circuit is associated with the grid and another resonant circuit is associated with the plate, this inherent capacity existing between grid and plate causes capacitive coupling between those two circuits, which coupling may in turn cause undesirable reactions, such as so-called regenerative action or the generation of electrical oscillations, which interfere with the operation of the system as a whole.

Capacitive coupling can, by means of this invention, be neutralized and regenerative action eliminated, whereby regenerative oscillation becomes impossible. The present invention is equally applicable to a great variety of circuits, employing high or low power, as, for example, carrier-wave telephony, power amplifiers in radio transmitting circuits, or radio receiving sets. Although several other methods have been suggested for this purpose, only a few of those methods satisfy the requirement that adjustments necessary for neutralizing the capacitive coupling be independent of the frequencies of alternating currents to which the system as a whole must be accommodated. The few other methods which do meet this requirement embody circuit arrangements essentially different from and more complex than those herein described, as will be clearly demonstrated hereinafter.

It is the purpose of the present invention to neutralize capacitive coupling existing between any two or more circuits by means of a rearrangement including the introduction of capacities, either inherent or in the form of condensers, where necessary, to form a network of pure capacities which can be adjusted so that there is no resultant capacitive coupling between any two of the circuits. The principles and circuit arrangements utilized in the practice of this invention are hereinafter described in detail with the aid of illustrations of a preferred embodiment.

In Figs. 1 to 7 inclusive, reference characters A and B represent electric circuts of any nature whatsoever; i. e., tuned, untuned or resonant circuits. Likewise, reference characters $C_1$, $C_2$, $C'$ and $C''$ represent capacities forming the four arms of a pure capacity bridge, and may be of any nature whatsoever, as, for example, condensers, or natural inherent capacities between circuit elements, or between audion electrodes. When one of these capacities is solely a natural inherent capacity, it is shown connected in dotted lines such as $C'$ in Figs. 2, 3, 4, 5, 6, 8 and 10, and $C_a$ in Fig. 8. Although condensers shown connected in dotted lines represent natural inherent capacities, it is understood that other capacities illustrated in the drawings may in part or in entirety also be natural, or inherent, or distributed capacities. The balanced condition of the bridge will obtain regardless of whether the capacities are naturally inherent, or whether they are added lumped capacities, or both, so long as the conditions set forth in Equation (1), below, are satisfied.

Figure 1:
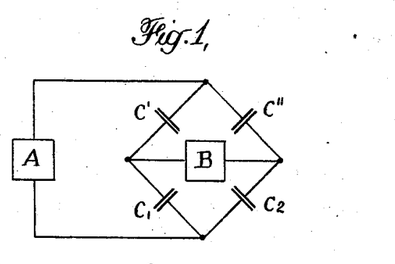
Fig. 1 is an elementary diagram of a pure capacity bridge illustrating the basic principle employed in this invention.

The elementary diagram shown in Fig. 1 represents a pure capacity bridge comprising four capacities, $C'$, $C''$, $C_1$ and $C_2$ connected with two circuits A and B. The values of the capacities are adjusted as necessary until no part of the voltage generated between the terminals of one circuit is impressed between the terminals of the other circuit. There must be no inductive coupling or resistance coupling between the two circuits if an accurate balance is to be obtained. The quantitative condition for an accurate balance or a neutralization of capacitive coupling between circuits A and B is:

$$(1) \quad \frac{C'}{C''} = \frac{C_1}{C_2}$$

In the fundamental circuit shown in Fig. 1, as well as those shown in the other figures, and for the purposes of this description, it is assumed that these four fundamental capacities are adjusted to satisfy the condition represented in the above equation. Inductive coupling, or resistance coupling, may then be introduced between the circuits if required, but the capacitive coupling will remain neutralized as long as Equation (1) is satisfied.

Figure 2:
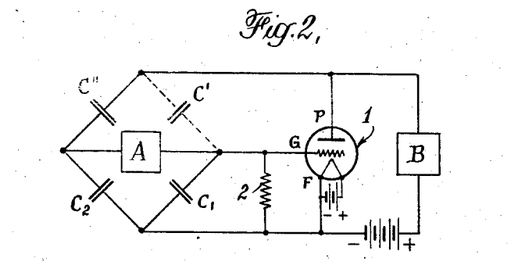
Fig. 2 is a circuit diagram showing one method of applying this invention to an audion circuit.

Fig. 2 shows the principle of this invention applied to a simple audion circuit which comprises a three-electrode vacuum tube, or thermionic valve. Here, as in Fig. 3, reference characters A and B can be regarded as the input and output circuits respectively of audion 1, which includes plate P, grid G and filament F. Since, according to common practice, the input circuit is always connected to the grid and the output circuit to the plate, the natural capacity between grid and plate ordinarily causes capacitive coupling between the input and output circuits. By arranging the capacity bridge as shown, this capacitive coupling is balanced and neutralized. In this, as well as in the circuit arrangements illustrated in the other figures, the capacity $C'$ may be considered as causing undesirable coupling to be neutralized. The grid leak or high resistance 2 connected between the grid and the filament circuit is introduced for the usual purpose of maintaining a constant average grid potential with respect to the filament. Such a resistance is a simple means for effecting the required grid potential, which may be either positive or negative with respect to the filament, as required by the particular audion employed, and may be obtained in many other ways, such as by the use of an impedance or a separate battery. Maximum amplification will be obtained when as high an input voltage as possible is impressed upon the grid of the audion, and it is therefore preferable that the ratio of capacity $\frac{C_2}{C_1}$ be considerably greater than unity.

Figure 3:
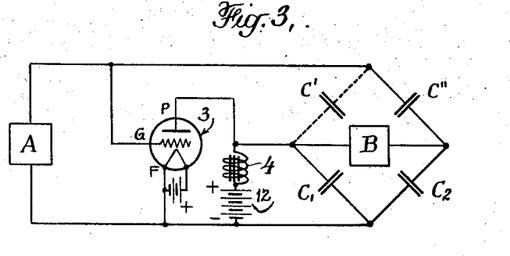
Fig. 3 illustrates an alternative method of applying this invention to an audion circuit.

The circuit arrangement illustrated in Fig. 3 is in general similar to that shown in Fig. 2 except that the neutralizing bridge is inverted with respect to the grid and plate. In this figure reference character A represents the input circuit connected to grid G and filament F of audion 3. Capacity $C'$ represents the natural inherent capacity existing between the grid G and plate P. Output circuit B is associated with the capacities $C_1$, $C_2$ and $C''$, which capacities are adjusted so that the balanced condition expressed by Equation (1) between circuits A and B is obtained. A choke coil 4 of high inductance and low electrostatic capacity is inserted in the plate circuit between plate P and plate battery 12 in order to by-pass the direct plate current past the capacities of the bridge, but which at the same time offers a high impedance to radio frequency currents flowing in the plate-output circuit, thus keeping those currents from flowing through the "B" battery 12.

Figure 4:
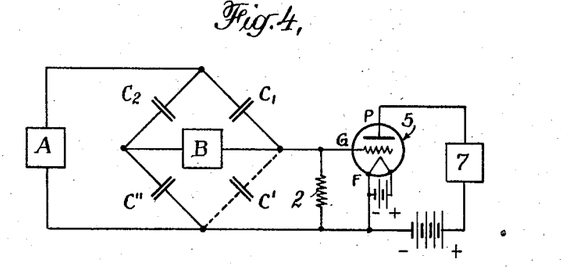
Fig. 4 shows the invention applied to an arrangement wherein the sum of the voltages from two circuits is impressed between two points connected by a capacity.

The circuit arrangement illustrated in Fig. 4 shows the elementary system of Fig. 1 applied to the input of an audion circuit. In this instance it will be assumed that circuits A and B may be considered as sources of two separate voltages impressed in series between two points connected by a capacity, which in this case is natural inherent capacity $C'$, represented as that capacity existing between the grid G and filament F of audion 5. When the two circuits A and B are electrically connected in series between the grid and filament, they are capacitively coupled by $C'$ existing between the grid and filament. This capacitive coupling is neutralized by supplying capacities $C''$, $C_1$ and $C_2$ in the bridge connection as shown. The voltage across $C'$ then comprises the sum of $$\frac{C_1}{C_1+C'}$$

times the voltage across circuit A, and $$\frac{C''}{C''+C'}$$

times the voltage across circuit B.

Figure 5:
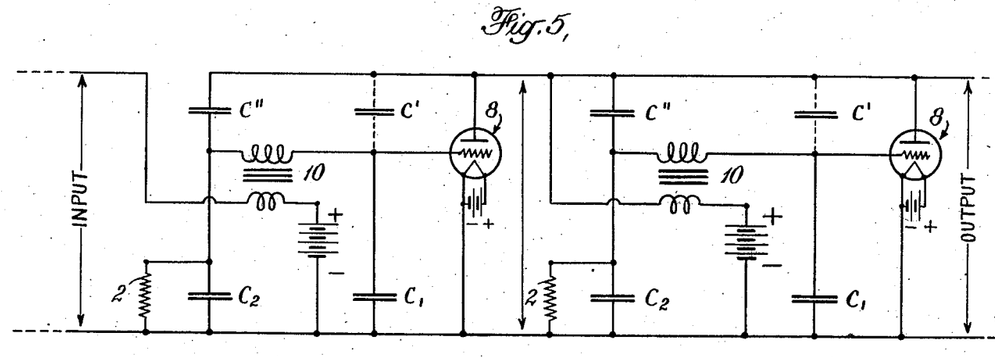
Fig. 5 is a circuit diagram showing the principles illustrated in Fig. 2 applied to a multistage audion amplifier utilizing untuned interstage transformers.

The circuit diagram in Fig. 5 illustrates two stages of a multistage amplifier employing the arrangement shown in Fig. 2 for neutralizing capacitive coupling between two consecutive transformers caused by the natural inherent capacity $C'$ between the grid and plate of audion 8. The two stages are identical so that only one need be here considered. Current fluctuations occurring in the circuit marked "Input", which in this example may be assumed to have originated in the output of a preceding stage, including the primary winding of transformer 10, induce corresponding fluctuations of potential across the grid-filament circuit of audion 8 through the secondary winding of transformer 10. This circuit is fundamentally identical with that illustrated in Fig. 2; capacities $C_1$, $C''$ and $C_2$ functioning similarly to the corresponding capacities of the former figure.

Figure 6:
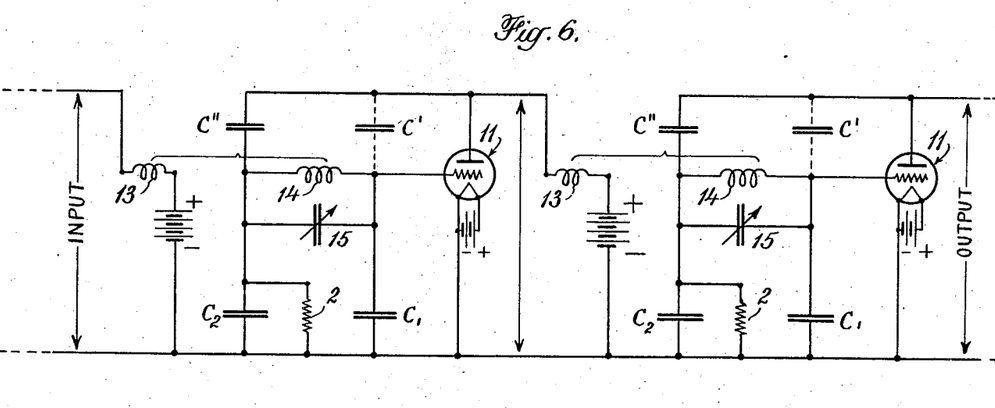
Fig. 6 is a circuit diagram showing the principles illustrated in Fig. 2 applied to a multistage audion amplifier employing tuned interstage transformers.

The circuit arrangement of Fig. 6 is essentially similar to that of Fig. 5 except that the untuned transformers 10 of Fig. 5 are here replaced with inductively coupled tuned transformers having a primary and secondary winding 13 and 14, respectively. Secondary winding 14 is tuned by means of variable condenser 15. In connection with Figs. 5 and 6, it is important to note that the neutralization of capacitive coupling is entirely independent of the degree of inductive coupling in the transformers indicated by 10 in Fig. 5, and 13—14 in Fig. 6.

Figure 7:
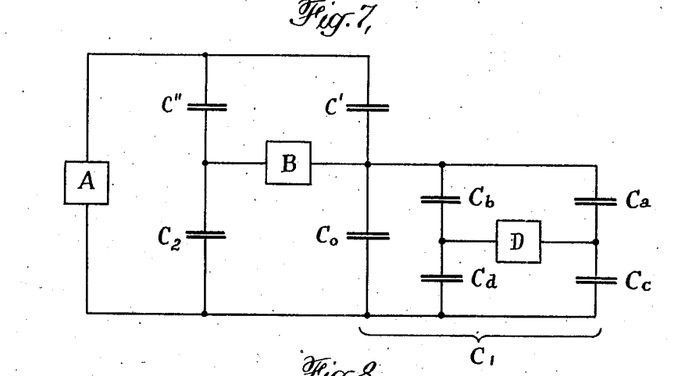
Fig. 7 is an elementary circuit diagram showing a modification of the present invention applied to a system of more than two circuits.

The schematic circuit arrangement shown in Fig. 7 is fundamentally the system illustrated in Fig. 1, with the addition of an appendant four-arm capacity bridge $C_a$, $C_b$, $C_c$, $C_d$ coupled through capacity $C_0$ to one arm of the bridge of Fig. 1. This arrangement thus results in an extended capacity bridge which neutralizes capacitive coupling through circuits A, B and D respectively. Capacity $C_1$ of Fig. 1 here includes a system of capacities which may be represented as:

$$(2) \quad C_1 = C_o + \frac{C_a C_c}{C_a+C_c} + \frac{C_b C_d}{C_b+C_d} = C_o + \frac{(C_a+C_b) \times C_c}{C_a+C_c}$$

By means of the appendant bridge $C_a$, $C_b$, $C_c$, $C_d$ the capacitive coupling between circuit D and the principal network A, B, $C'$, $C''$, $C_o$ and $C_2$ is neutralized when $$(3) \quad \frac{C_a}{C_b} = \frac{C_c}{C_d}$$

corresponding to Equation (1) for the simple capacity bridge. Equation (3) being satisfied, the appendant bridge acts as a pure capacity in the $C_1$ arm of the principal network in shunt to $C_o$. The condition for neutralization of capacitive coupling in the principal network is that represented by Equation (1), namely $$\frac{C'}{C''} = \frac{C_1}{C_2}.$$

This arrangement of Fig. 7 can obviously be extended to any number of circuits by appending subordinate bridges to any capacity arm of the network, as, for example, in the $C_2$ arm or the $C_c$ arm.

Figure 8:
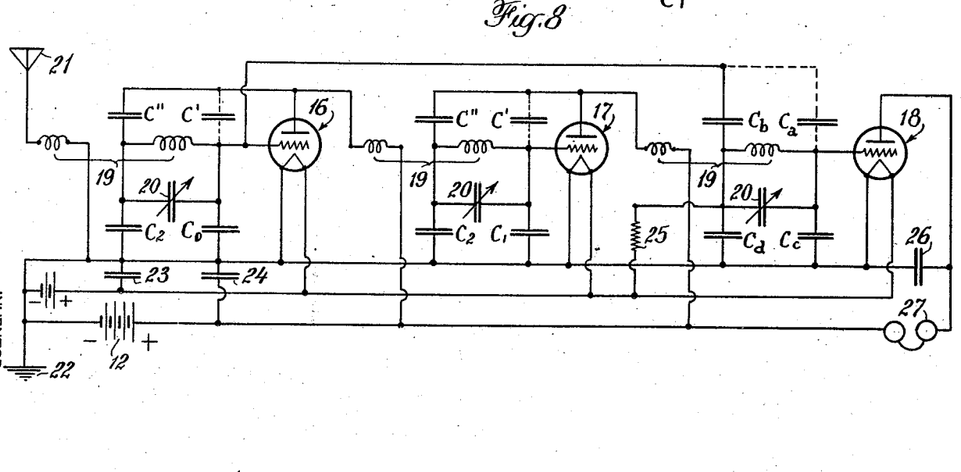
Fig. 8 is a circuit diagram of a radio receiver employing a two-stage radio-frequency amplifier which utilizes the principles illustrated in Fig. 7 as applied to an amplifier of the type shown in Fig. 6.

Fig. 8 shows a circuit diagram of a radio receiver employing two stages of tuned radio-frequency amplification and a detector or rectifier. This circuit arrangement includes three tuned transformers each comprising two inductively coupled windings 19, the secondary of each transformer being tuned by variable condenser 20. Neutralization of capacitive coupling is here obtained by utilization of the fundamental circuits illustrated in Figs. 1 and 7. The complex bridge of Fig. 7 neutralizes capacitive coupling due to inherent capacity $C'$ in audion 16 as well as that due to incidental natural capacity $C_a$. The simple bridge method of Fig. 1 is employed to neutralize coupling due to inherent capacity $C'$ in audion 17. The incidental natural capacity $C_a$ occurs between exposed conducting surfaces connected to the grid of audion 16 and exposed conducting surfaces connected to the grid of audion 18. The circuits associated with radio-frequency amplifying audions 16 and 17, respectively, are essentially similar to those illustrated in Fig. 6. This circuit shows a rectifying audion 18 connected to the output of radio-frequency amplifier 17. In the output circuit of the rectifying audion are telephone receivers 27 and the usual plate circuit battery 12. Condenser 23 is placed so as to prevent any possible voltage, due to radio-frequency currents, across the filaments of audions 16 and 17. Likewise, for the same purpose, a by-pass condenser 24 is connected across the common plate battery 12 and leads thereto. By-pass condenser 26 is connected directly from the plate to the filament circuit of rectifying audion 18 to by-pass any possible radio-frequency currents flowing in the plate circuit of that audion which might set up a voltage across telephone receivers 27. In order that rectification may take place at the most advantageous portion of the grid-potential—grid-current characteristic curve of audion 17, a grid leak 25 may be connected, as shown, between the grid circuit of that tube and its filament circuit.

Figure 9:
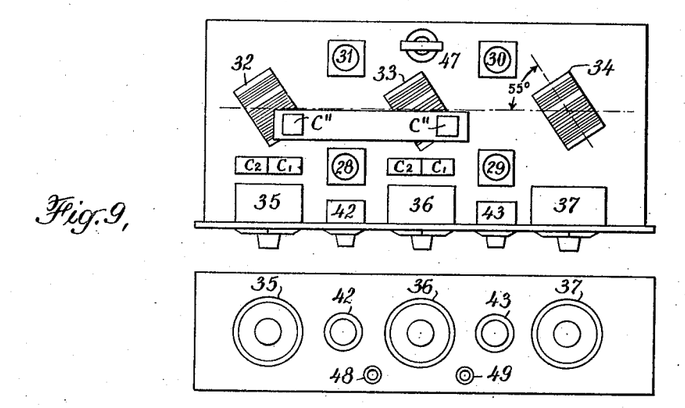
Fig. 9 shows plan and front elevational views of a practicable embodiment of this invention as applied to a radio receiving set.
Figure 10:
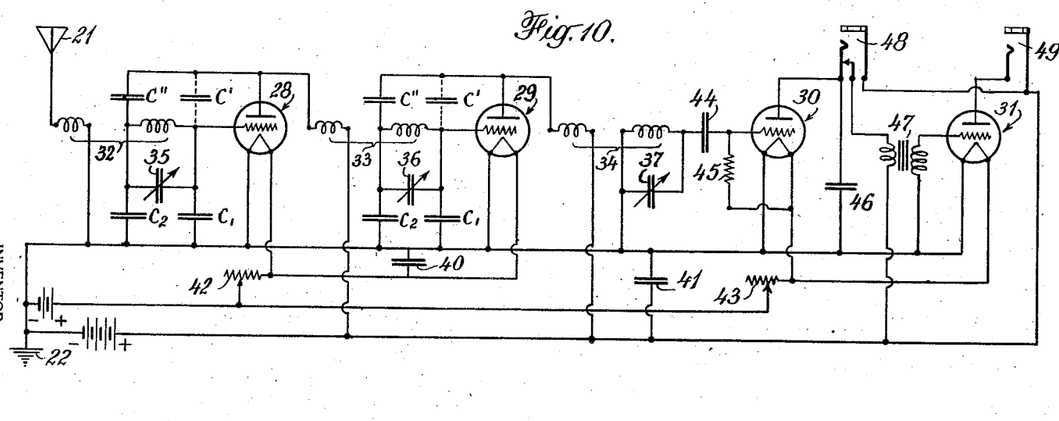
Fig. 10 is a circuit diagram of the radio receiving set illustrated in Fig. 9.

Figs. 9 and 10 show the instrument layout and circuit diagram, respectively, of a radio receiving set to which the present invention has been successfully applied. The receiver illustrated has been constructed and demonstrated to be entirely satisfactory. This receiver comprises two stages of tuned radio-frequency amplification, a rectifier or detector, and one stage of audio-frequency amplification. The upper or plan view of Fig. 9 shows a suggested arrangement of the instruments employed in this receiver numbered to correspond with the symbolic representation in Fig. 10. The front elevational view in Fig. 9 shows the arrangement of tuning controls, filament controls and two telephone jacks, later to be described in detail. Attention is called to the positioning of interstage transformers 32, 33 and 34 placed with their centers on the same straight line to which their axes incline at an angle of substantially 55°, in order to eliminate magnetic coupling between the respective coils. Suitable magnetic shielding could be employed as an alternative. The two stages of radio-frequency amplification are substantially similar to the two stages of radio-frequency amplification described in connection with Fig. 8, and comprise audions 28 and 29 coupled to the antenna, to each other, and to the rectifying audion, respectively, by the transformers 32, 33 and 34, which are tuned by condensers 35, 36 and 37, respectively. The output of the detector tube may be tapped at telephone jack 48, into which may be inserted a telephone plug connected to telephone receivers. In order to obtain louder signal response, the telephone plug may be inserted in jack 49 connected in the output circuit of audio-frequency amplifier 31, which is coupled to the output of rectifier 30 through audio transformer 47.

Inductively coupled transformers 32, 33 and 34 may comprise a secondary, or grid coil, of 55 turns of insulated wire, and a primary, or antenna or plate, coil of 20 turns of insulated wire wound end to end on a cylindrical insulating form 2½ inches in diameter. Variable condensers 35, 36 and 37, suitable to tune these coils, may have a maximum capacity of approximately 500 micro-microfarads in order that the receiver may cover a frequency band of approximately 1250 to 550 kilocycles. By-pass condenser 40, having a capacity of 1 microfarad, is connected across the filaments of audions 28 and 29 in order to prevent any radio-frequency currents from setting up a voltage across the filaments; and by-pass condenser 41, of the same capacity, may be connected, as shown, across the common plate battery in order to obviate the possibility of radio-frequency currents setting up a voltage across that battery. The current supplying the filaments of audions 28 and 29 connected in parallel is controlled by rheostat 42, and likewise the current supplied to the filaments of audions 30 and 31 is controlled by rheostat 43.

One successful method of balancing and neutralizing the grid-plate capacitive coupling in radio-frequency amplifying audions 28 and 29, which for this illustration may be assumed to have a grid-plate capacity of approximately 10 micro-microfarads, is as follows: Strong alternating current variable within the frequency band for which the amplifier is designed is introduced in the input at points 21 and 22, and the tuning control 35 is varied to give maximum response in the telephone receivers which may be plugged into jacks 48 or 49. The connection is then broken at one filament terminal of audion 28 whose grid-plate capacity $C'$ is now to be balanced and neutralized. With the constants specified it will be found that when $C'$ is 10, $C_1$ is 60, and $C_2$ is 480 micro-microfarads, and $C''$, which is preferably a small variable condenser, is adjusted to 80 micro-microfarads, a minimum response will be obtained in the telephone receivers, indicating a complete balance of capacity $C'$. Similarly, a like balancing method may be utilized in neutralizing grid-plate capacity $C'$ of audion 29. It may be noted in view of the requirement that the bridge will be balanced when Equation (1) is satisfied, that these suggested values for the capacities of the four bridge arms represent the total effective values of capacity between the points indicated, and in every case are inclusive of any natural or inherent capacities, such as the inherent capacity between grid and filament of the audions in Fig. 10 which is to be added to the value of the added condenser at $C_1$ to give the total suggested value of 60 mmf. at $C_1$.

After the grid-plate capacities of audions 28 and 29 are neutralized, it will be found that the receiver may be tuned throughout the frequency band for which it is designed without any accompanying undesirable reactions due to capacity feedback action from plate to grid due to inherent grid-plate capacitive coupling in the audions.

In complex capacity bridges, methods of adjustment to effect a balance must be devised to suit the circumstances. For instance, referring to Fig. 7, the subordinate bridge $C_a$, $C_b$, $C_c$, $C_d$ must be adjusted and balanced before the principal network $C'$, $C''$, $C_0$ and $C_2$ is balanced.

Audion amplifiers embodying this invention, as, for instance, amplifiers consisting of one or more stages, after the manner shown in Figs. 5 or 6, are sometimes especially useful by virtue of their action as uni-directional relays. Because of the action of the audion as an amplifier, alternating currents are repeated and amplified in the direction from grid to plate, but, due to the properties of the capacity bridge and the absence of repetition in the audion from plate to grid, alternating currents are not allowed, under proper conditions, to pass in the reverse direction. In regenerative, or feed-back, and also in heterodyne, or beat method, receiving systems where alternating currents are generated locally in the receivers, an amplifier having this uni-directional characteristic, balanced according to the suggested method and connected between the antenna and the oscillating audion, not only amplifies the received signal, but also prevents the locally generated currents from being transmitted from the antenna and thereby interfering with other reception in the vicinity.

It should be noted that in the cases shown in Figs. 2, 3, 5, 6, 8 and 10, it is a distinct advantage to make the ratio $\frac{C'}{C_1}$ as small as possible without materially affecting the associated circuits, A and B in Figs. 2 and 3, 10, 10, in Fig. 5, 14—15, 13 in Fig. 6, etc. For instance, in the set described in Figs. 9 and 10, this ratio is approximately 1/6, which in that case is entirely satisfactory.

Such a ratio is desirable in order that a maximum degree of amplifying action may be attained. With a given difference of potential between the grid and filament impressed upon capacities $C'$ and $C_1$ in series, the grid would be at the same potential as the plate if $C'$ were infinitely large; hence, it is desirable that $C'$ be as small as possible in order that there may be a large potential drop from the plate to the grid across $C'$, as compared with the potential drop across $C_1$. Conversely, as the capacity value of $C_1$ is increased, the potential on the plate with respect to the filament is decreased due to current flowing through $C_1$. Hence, it is preferable that $C'$ be as small as possible, and that $C_1$ be large as compared with $C'$ within the limits determined by the tuning ranges desired, by the voltage characteristic of the audion, by the output and input impedances of the audions employed, and by the practicable values of capacities $C''$ and $C_2$.

The reason for the desirability of this ratio of capacity values may also be described in another way, (see also Fig. 2), namely: that an input voltage impressed across the grid and filament, or input circuit (A), does not introduce a voltage in the output circuit (B) because those two circuits are conjugate arms of a balanced bridge, but this input voltage does introduce a voltage between the grid and filament across one arm, $C_1$, of the bridge. This effect is equivalent to introducing a conductance across the grid circuit from grid to filament which increases with the ratio $\frac{C'}{C_1}$ making the grid circuit less efficient and consequently decreasing the degree of amplification. Hence, the ratio $\frac{C'}{C_1}$ should be as small as possible.

For the reasons above pointed out, the value of the capacity $C_1$ added between the grid and filament should be large compared with the natural inherent plate-grid capacity, $C'$.

I claim:

1. In combination with two capacitively coupled circuits, each having two terminals, a capacity bridge comprising four capacities each connected from a terminal of one circuit to a terminal of the other circuit, said four capacities having such ratios as to neutralize said capacitive coupling between said circuits, at least one of said four capacities being the resultant capacity of an appendant capacity bridge.

2. In combination with two capacitively coupled circuits, each having two terminals, a capacity bridge comprising four capacities, a pair of which capacities is connected to one terminal of one of said circuits, the other pair of said capacities being connected to the other terminal of said first-mentioned circuit, one of said capacities of each pair being connected to one of the terminals of said other circuit, and the other of said capacities of each pair being connected to the other of the terminals of said other circuit, at least one of said four capacities being the resultant capacity of an appendant capacity bridge.

3. An amplifying system including at least one audion having grid, plate and filament electrodes, an input circuit connected to said grid, and an output circuit connected to said plate, inherent grid-plate capacity coupling between said input and output circuits, inherent grid-filament capacity, and a capacity bridge comprised of a plurality of pure capacities only associated with the input circuit, said bridge being effective to neutralize said inherent capacitive coupling, at least one of the capacities of said bridge being connected between the grid and filament electrodes of said audion and being of a value substantially larger than that of the inherent grid-plate capacity.

4. An amplifying system including at least one audion having grid, plate and cathode electrodes, an input circuit connected to said grid, and an output circuit connected to said plate, inherent grid-plate capacitive coupling between said input and output circuits, inherent grid-cathode capacity, and a capacity bridge composed of a plurality of pure capacities only associated with the input circuit, said bridge being effective to neutralize said inherent capacitive coupling, at least one of the capacities of said bridge being connected between the grid and cathode electrodes of said audion and being of a value substantially six times that of the inherent grid-plate capacity.

5. An amplifying system including at least one audion having grid, anode and cathode electrodes, an input circuit connected to said grid, an output circuit connected between said anode and cathode, inherent grid-anode capacity coupling said input and output circuits, and a four-arm balanced bridge network having as two arms, respectively, said grid-anode capacity and a substantially larger capacity connected between said grid and cathode, and having as conjugate arms said input and output circuits.

6. An amplifying system including at least one audion having grid, anode and cathode electrodes, an input circuit connected to said grid, an output circuit connected between said anode and cathode, inherent grid-anode capacity coupling said input and output circuits, and a four-arm balanced bridge network having as two arms, respectively, said grid-anode capacity and a capacity substantially six times larger than said inherent grid-anode capacity between said grid and cathode, and having as conjugate arms said input and output circuits.

7. An electrical system including an audion having two input electrodes coupled by inherent capacity, two input circuits coupled to said electrodes, and means for neutralizing the resulting capacitive coupling between said input circuits, said means comprising a balanced bridge network having as conjugate arms said input circuits and having four capacitive balancing arms, one of said capacitive arms including said inherent capacity.

8. An electrical network including three circuits, each coupled to both of the other two, and means for neutralizing all said couplings, said means comprising a main balanced bridge having as conjugate arms two of said three circuits and having four balancing arms, one of said balancing arms including an auxiliary balanced bridge having four balancing arms and having as two conjugate arms, respectively, the other one of said three circuits and the remaining part of said main bridge.

9. The combination with a three-electrode thermionic device of a substantially balanced Wheatstone bridge in an arm of which is included the capacity between the grid and cathode of said thermionic device, the capacity between the grid and anode of said thermionic device connected in another arm of said bridge, impedances in the remaining arms of said bridge independent of the bridge arm, an input element operatively related to said bridge and a second Wheatstone bridge of four balanced impedances, two of which are connected across one of the impedance arms of said first bridge.

10. The combination with a three-electrode thermionic device of a substantially balanced Wheatstone bridge in an arm of which is included the capacity between the grid and cathode of said thermionic device, the capacity between the grid and anode of said thermionic device connected in another arm of said bridge, capacities in the remaining arms of said bridge, an input element independent of the bridge arms operatively associated with said bridge, and a second balanced Wheatstone bridge associated with a second three-electrode thermionic device, the four arms of said second bridge comprising capacities, two of which are connected across the capacity between grid and cathode of said first thermionic device, the arms of said second bridge being proportioned with respect to those of said first bridge to maintain both bridges in a balanced condition.

11. In an audion amplifier an audion tube having an inherent grid-plate capacity, a capacity between the grid and cathode of said tube, two capacities in the plate circuit of said tube and circuit connections whereby the said capacities are connected to form a Wheatstone bridge having four capacitive arms, and a second audion tube having associated with its input circuit a second Wheatstone bridge of four capacitive arms, said input circuit being in a conjugate arm of said second bridge, two of the capacitive arms of said second bridge being connected effectively in shunt with the capacity between the grid and cathode of said first bridge, both bridges being proportioned to maintain themselves in a balanced condition.

12. A radio receiving apparatus comprising a repeating coil having a secondary coil and a vacuum tube having a cathode, grid and plate, elements forming in effect a Wheatstone bridge with substantially pure capacity only forming each arm thereof, a pair of series-connected condensers, a tap from said cathode to the common terminal of said condensers, each condenser being an arm of said bridge, the grid-to-plate capacity being a third arm thereof, and the secondary coil of said repeating coil being connected across the remaining terminals of said condensers, and a second vacuum tube having an input circuit comprising a repeating coil with a secondary coil connected between diagonally opposite terminals of a Wheatstone bridge of four capacities, one of the remaining diagonals of said bridge being connected to the grid of said first tube.

13. Apparatus for preventing self-oscillation in a tandem-connected radio-frequency amplifier comprising an amplifier tube having a cathode, a grid and a plate, a Wheatstone bridge arrangement having in one arm the grid-to-plate capacity of said tube, a capacity in another arm of said bridge, a pair of series-connected condensers, one in each of the remaining arms of said bridge and so adjusted as to substantially balance the same, a coupled input inductance connected in shunt to said condensers and a tap to the tube cathode from the common terminal of said condensers, and another tube in said tandem arrangement having a Wheatstone bridge of four capacities associated with its input, a coupled input inductance therefor being connected across diagonally opposite terminals of said second bridge, the remaining diagonally opposite terminals of said second bridge being connected across two adjacent terminals of said first bridge, the elements of said bridges being proportioned to maintain themselves in a balanced condition.

14. The combination with a three-electrode vacuum tube of a circuit connected to the anode and containing two condensers, a connection from the cathode to a point between said condensers, a circuit connected to the grid and a capacity inserted between the two circuits to balance the capacity between the grid and anode of said tube, and another three-electrode tube having an input impedance connected to the grid thereof, a capacity between the grid and cathode thereof, a capacity between the cathode and the remaining terminal of said input impedance, a distributed capacity between the grids of said first and second tubes and a capacity between said remaining end of said input impedance and the grid of said first tube to balance the capacity arrangement associated with said second tube.

In testimony whereof I affix my signature.

HAROLD A. WHEELER.